(12) United States Patent
Matsuo

(10) Patent No.: US 7,116,797 B2
(45) Date of Patent: Oct. 3, 2006

(54) OPTICAL RECORDING MEDIUM AND REPRODUCING APPARATUS

(75) Inventor: Toshihisa Matsuo, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 711 days.

(21) Appl. No.: 10/023,062

(22) Filed: Dec. 14, 2001

(65) Prior Publication Data

US 2002/0118565 A1 Aug. 29, 2002

(30) Foreign Application Priority Data

Dec. 22, 2000 (JP) ............................. 2000-391580

(51) Int. Cl.
*G06K 9/00* (2006.01)

(52) U.S. Cl. ................. 382/100; 369/30.03; 369/44.31

(58) Field of Classification Search ................ 382/100, 382/232, 240; 380/51, 54, 210, 252, 287, 380/201; 348/461, 463; 713/176, 179; 725/20, 22; 399/366; 705/57, 58; 283/74–81, 283/901, 902; 358/3.28; 386/94; 369/30.38, 369/16, 30.03; 720/668, 695, 703, 715, 718, 720/745; 345/103, 221

See application file for complete search history.

(56) References Cited

U.S. PATENT DOCUMENTS

| | | | |
|---|---|---|---|
| 4,569,038 A * | 2/1986 | Nagashima et al. ...... | 369/44.26 |
| 5,807,640 A | 9/1998 | Ueno et al. | |
| 5,838,658 A * | 11/1998 | Nakane et al. ............ | 369/275.4 |
| 6,252,285 B1 * | 6/2001 | Furumiya et al. ............ | 257/432 |
| 6,338,889 B1 * | 1/2002 | Shibata et al. ............. | 428/64.4 |
| 6,580,682 B1 * | 6/2003 | Kamperman et al. .... | 369/275.3 |
| 6,678,236 B1 * | 1/2004 | Ueki ........................ | 369/275.3 |
| 6,735,160 B1 * | 5/2004 | Miyashita et al. ........ | 369/59.12 |
| 2001/0030932 A1 | 10/2001 | Spruit et al. ............. | 369/275.2 |

FOREIGN PATENT DOCUMENTS

| | | |
|---|---|---|
| EP | 0 908 881 A2 | 4/1999 |
| EP | 1 083 560 A2 | 3/2001 |
| JP | 07-085574 | 3/1995 |
| JP | 11-162031 | 6/1999 |
| JP | 11-288556 | 10/1999 |
| JP | 11-306675 | 11/1999 |
| JP | 2000-242929 | 9/2000 |
| JP | 2000-251395 | 9/2000 |

(Continued)

OTHER PUBLICATIONS

"Data Hiding Techinque Supporting digital Watermark", Walter Bender, et al., *Nikkei Electronics*, Feb. 24, 1997 (No. 683) pp. 149-162 and Mar. 10, 1997 (No. 684), pp. 153-168, partial translation.

(Continued)

*Primary Examiner*—Jingge Wu
*Assistant Examiner*—Abolfazl Tabatabi
(74) *Attorney, Agent, or Firm*—David G. Conlin; David A. Tucker; Edwards Angell Palmer & Dodge LLP

(57) ABSTRACT

In an optical recording medium of the present invention, plural pits which carry main information recorded in a user area and tangential push/pull (T-PP) information required for reproducing the main information recorded in T-PP area are formed. The pit length in a track direction is formed according to the main information, and the pit depth is formed according to the T-PP information, and copyright protection information by digital watermarking is embedded in the main information. Also, if the optical disk by unauthorized copying is loaded, a reproducing apparatus restricts the reproduction thereof.

18 Claims, 11 Drawing Sheets

FOREIGN PATENT DOCUMENTS

| | | |
|---|---|---|
| JP | 2001-76347 | 3/2001 |
| KR | 2001-0040079 | 5/2001 |
| WO | WO-95/18443 | 7/1995 |

OTHER PUBLICATIONS

*Nikkei Electronics*; issued on Feb. 24, 1997; pp. 100-107.
*Nikkei Electronics*; issued on Oct. 9, 2000; pp. 136-137.

* cited by examiner

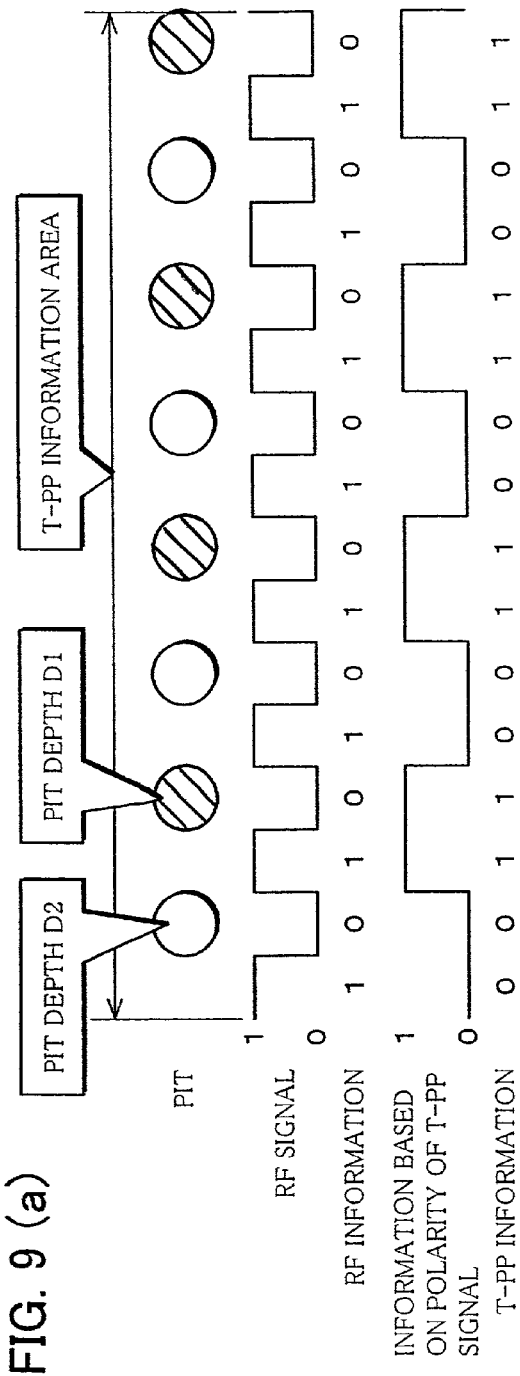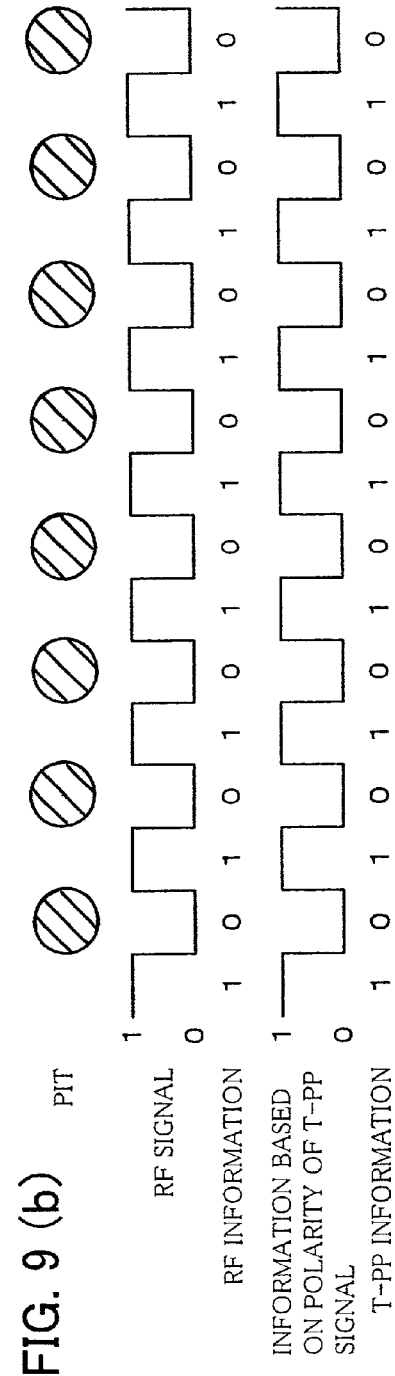
FIG. 9 (a)
FIG. 9 (b)

OPTICAL RECORDING MEDIUM AND REPRODUCING APPARATUS

FIELD OF THE INVENTION

The present invention relates to an optical recording medium which prevents unauthorized copying of copyrighted information, and a reproducing apparatus which sets reproducing restriction if the recording medium by unauthorized copying is loaded therein.

BACKGROUND OF THE INVENTION

In recent years, an optical disk such as CD and DVD has widely been used as an information recording medium.

The information recording medium can be roughly divided into three types: a read only type called ROM, a write once type called R, and a rewritable type called RW.

Also, the recording and reproducing appararus for the recording medium has been developed and significantly popularized.

In the information recording medium, an optical disk includes at least the following characteristics (1)–(4):

(1) Compared to a magnetic tape medium, optical disk provides a better access performance to information;

(2) Compared to a semiconductor memory, recording capacity per unit is larger, and low unit price of capacity can be realized;

(3) It is possible to separate the optical disk from an apparatus itself and to handle the optical disk indivisually; and (4) It is possible to preserve recorded information in a good condition.

The above-mentioned characteristics (1) and (2) also correspond to those of hard disk apparatus, and the hard disk apparatus is widely recognized and popularized for the use of temporarily storing information.

The reason an optical disk and an optical disk apparatus have been developed and popularzed separately from a hard disk apparatus is mainly because of the above characteristics (3) and (4).

An optical disk is the most suitable information recording medium for storing a large volume of information such as movie and music, which allows one to buy and sell a medium itself.

An optical disk is also suitable for carefully recording and storing information which has been produced personally, and in case of a shortage of capacity, it is possible to increase the capacity for storing information only by making an additional medium, which can be obtained at low cost as noted in the above characteristics (2).

An optical disk has not only these good characteristics but also some problems.

That is, information recorded on the optical disk is digital information. Unlike analog information, digital information, which is re-recorded to another digital recording apparatus, in principle does not deteriorate with respect to original information. This means that it is possible to copy as much information which is the same as the original information as one likes.

Meanwhile, some optical disks in which movie and music are stored include copyrighted image and audio information. Unauthorized copying of the optical disk including such copyrighted information to other inexpensive recording medium, that is, distribution of a pirated edition to the public, is considered as an infringement of copyright.

As methods for protecting copyright with respect to the optical disk, the following techniques (1)–(3) are known.

(1) For example, CSS (Content Scrambling System), a copyright protection system using the encryption technique, is selected for DVD. Encrypting copyrighted information to be recorded on the optical disk prevents unauthorized reproduction of information.

(2) Data is recorded on the optical disk in two different pit depths, so that information based on a quantity of reflected light from the pit and information based on the polarity of tangential push/pull signal from the pit are obtained (Japanese Laid-Open Patent Publication by the present applicant: JP-A-2001-76347, published on Mar. 23, 2001).

Even if pit information of this optical disk is copied, information based on the polarity of tangential push/pull signal can not be copied physically to other recording medium.

The reason for this is that the tangential push/pull signal is generated by physically changing the pit depth, making it impossible for other recordable medium (magnetic recording medium or phase change recording medium) to record it.

Therefore, recording copyright over the information based on the polarity of tangential push/pull signal makes it possible to set reproducing restriction on the recording medium from which the information cannot be detected.

(3) Digital watermarking technique is recently focused on. The digital watermarking technique has been introduced, for example, in NIKKEI ELECTRONICS (issued on Feb. 24, 1997, p149-p162).

In digital watermarking technique, copyright information can be embedded in copyrighted information. The embedded copyright information, even if it is copied, remains in information copied by unauthorized copying, thereby finding whether or not the information is the subject of copyright protection.

However, the prior art described above has the following problems.

In the copyright protection technique described in the above (1), at the stage of decrypting the encryption, original copyrighted information can be read out.

Many users watch DVD on a recent personal computer, and in such case, decryption is often performed on the CPU of the personal computer with software.

Thus, it is possible for one who has some level of knowledge and technique to decrypt encrypted copyrighted information and to read it out as digital information by tempering with the software.

By copying the digital information to other recordable recording medium such as an optical disk, a pirated edition, which can be reproduced in a common reproducing apparatus, is produced.

In the technique using the tangential push/pull signal described in the above (2), it is possible to set reproducing restriction on the optical disk from which information based on the tangential push/pull signal cannot be detected, that is, the optical disk assumed to have been copied by unauthorized copying.

However, this means that the reproducing restriction is also set on the optical disk which does not include information based on the polarity of tangential push/pull signal (optical disk in which copyright-free information is recorded, write once disk, and rewritable disk).

In addition, in the technique (2) described above, it is impossible to prevent unauthorized copying of data that was created, for example, by encoding images delivered on a screen.

In the digital watermarking technique described in the above (3), the copyright information by digital watermarking remains in the disk of pirated edition.

Therefore, it is possible to detect whether or not the disk of pirated edition includes copyrighted information.

However, while this technique may be able to warn the user, it is not capable of preventing copying to other recording medium. Therefore, re-distribution of the disk of pirated edition to the public is possible, and the product disk of pirated edition can still be reproduced by a common reproducing apparatus.

In addition, in the technique (3) described above, if a measure is taken to prohibit recording and reproducing of the recording medium in which copyright information is not embedded, it becomes impossible to reproduce the recording medium which is not subject to copyright protection.

SUMMARY OF THE INVENTION

An object of the present invention is to provide an optical recording medium which can prevent reproduction from unauthorized copies, and a reproducing apparatus which can prohibit recording and reproducing of unauthorized copies based on encoded data and which can reproduce write-once and rewritable optical recording medium which are not subject to copyright protection.

The above-mentioned object can be achieved by an optical recording medium of the present invention in which main information and additional information which is required to reproduce the main information are recorded, the additional information is formed physically, and copyright protection information by digital watermarking is embedded in the main information.

That is, with respect to the optical recording medium, the additional information is formed physically and copyright protection information by digital watermarking is embedded in the main information.

According to this invention, the optical recording medium carries the main information and the additional information. The additional information is the information which is required to reproduce the main information.

Since the additional information is formed physically, it cannot be copied to another recordable optical recording medium. That means, in case of unauthorized copying, the additional information which is formed physically is not detected; therefore, the optical recording medium by unauthorized copying cannot be reproduced properly.

On the other hand, copyright protection information is embedded in the main information by digital watermarking. In copying to another recordable optical recording medium, the copyright protection information is copied as it is. That is, in case of unauthorized copying, this copyright protection information is detected.

As described above, in case of unauthorized copying, even if this optical recording medium is reproduced, the additional information formed physically is not detected, but the copyright protection information embedded in the main information is detected.

Therefore, this result of detection makes it possible to judge accurately whether or not the optical recording medium is the one by unauthorized copying.

For a fuller understanding of the nature and advantages of the invention, reference should be made to the ensuing detailed description taken in conjunction with the accompanying drawings.

BRIEF DESCRIPTION OF THE DRAWINGS

FIG. 9($a$) is an explanatory drawing illustrating the case where main information is an object of copyright protection, FIG. 9($b$) is an explanatory drawing illustrating the case where main information is not an object of copyright protection.

DESCRIPTION OF THE EMBODIMENTS

Referring to FIG. 1 through FIG. 9, an embodiment of the present invention is described below.

Referring to FIG. 4 to FIG. 9, tangential push/pull signal (hereinafter "T-PP signal") as additional information is described below.

The additional information is required to reproduce main information (copyrighted information).

The currently employed mode of recording information with respect to a read only optical disk, as represented by CD and DVD, which records information in the form of pits is based on a method called pit length recording whereby information is represented by the presence or absence of pits, pit shape, and pit length in the track direction.

While rotating the optical disk, an optical beam spot is guided to a pit, and reflected light from the pit is focused on a photo-detector and converted to an electric signal to be outputted as an RF signal. The RF signal is a reproducing signal of the information recorded in the optical disk.

Figure 4:
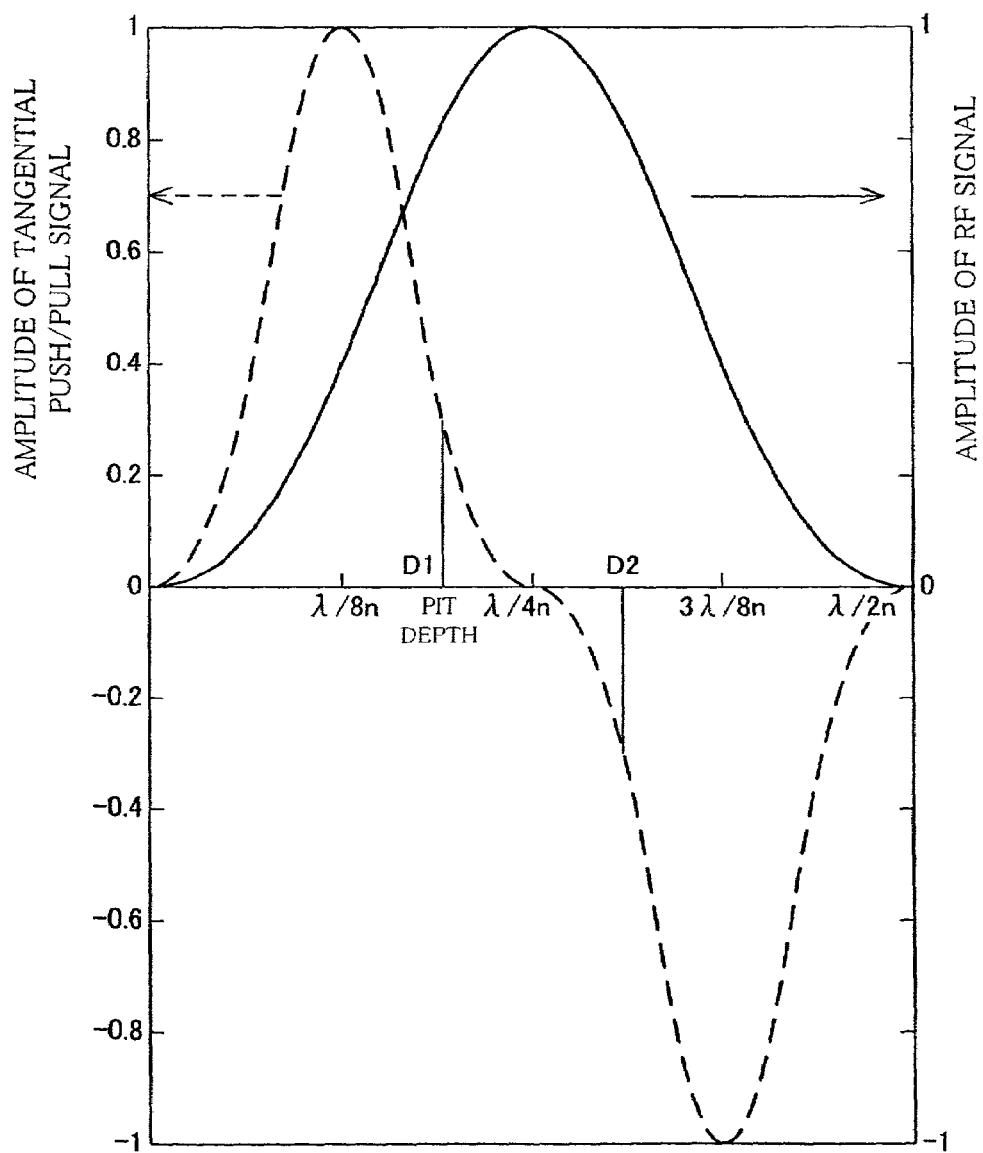
FIG. 4 is an explanatory drawing illustrating the relationship between pit depth and amplitude of RF signal and T-PP signal.

FIG. 4 shows a relationship between pit depth and respective amplitudes of RF signal and T-PP signal. In FIG. 4, a horizontal axis indicates pit depth, $\lambda$ indicates a wavelength of the light beam used (reproducing light beam), and n indicates a refractive index of the substrate of the optical disk (coverglass of the optical disk).

As is clear from FIG. 4, the amplitude of RF signal is maximum at the pit depth of $\lambda/4n$. This maximum value is normalized as 1 in FIG. 4.

The amplitude of T-PP signal is maximum at the pit depth of $\lambda/8n$. This maximum value is normalized as 1 in FIG. 4. The polarity of T-PP signal is reversed at the pit depth of $\lambda/4n$.

Figure 5:
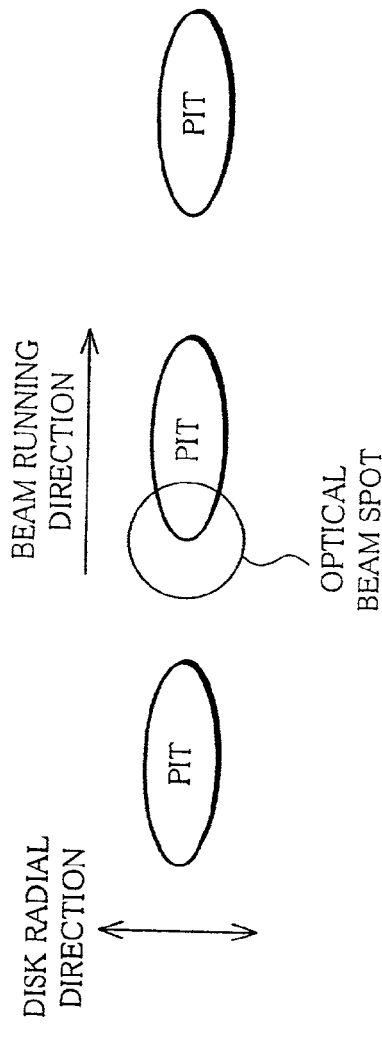
FIG. 5($a$) is an explanatory drawing illustrating how an optical light beam spot runs on pits in a beam running direction, and FIG. 5($b$) is an explanatory drawing illustrating how reflected light from the optical disk is focussed on the photodetector composed by dichotomized photoreceptors A and B.
Figure 5:
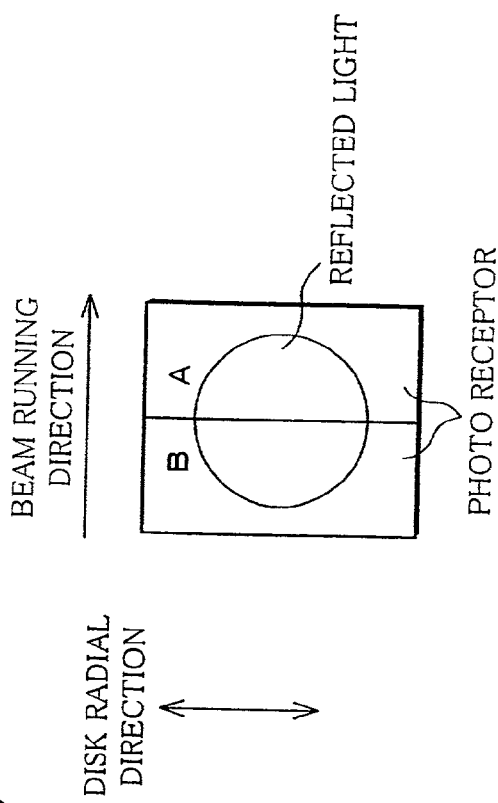

Next, referring to FIG. 5 and FIG. 6, RF signal and T-PP signal are described below.

FIG. 5(a) shows a state in which the optical light beam spot is running in the beam running direction on the pits, FIG. 5(b) shows a state in which the reflected light from the optical disk is being focussed on the photodetector composed by dichotomized photoreceptor A and B.

Using the output of the dichotomized photoreceptor A and B, RF signal and T-PP signal are found from the respective equations as follows.

$$RF = A+B \quad (1)$$

$$T\text{-}PP = A-B \quad (2)$$

RF signal corresponds to the sum of the quantity of the light incident on the photoreceptor A and B among the reflected light from the optical disk. While light beam spot is on the pit, the light irradiated on the pit is diffracted by the pit and the quantity of the light incident on the photoreceptor A and B decreases. As a result, the level of RF signal declines. FIG. 6 shows how RF signal changes.

Figure 6:
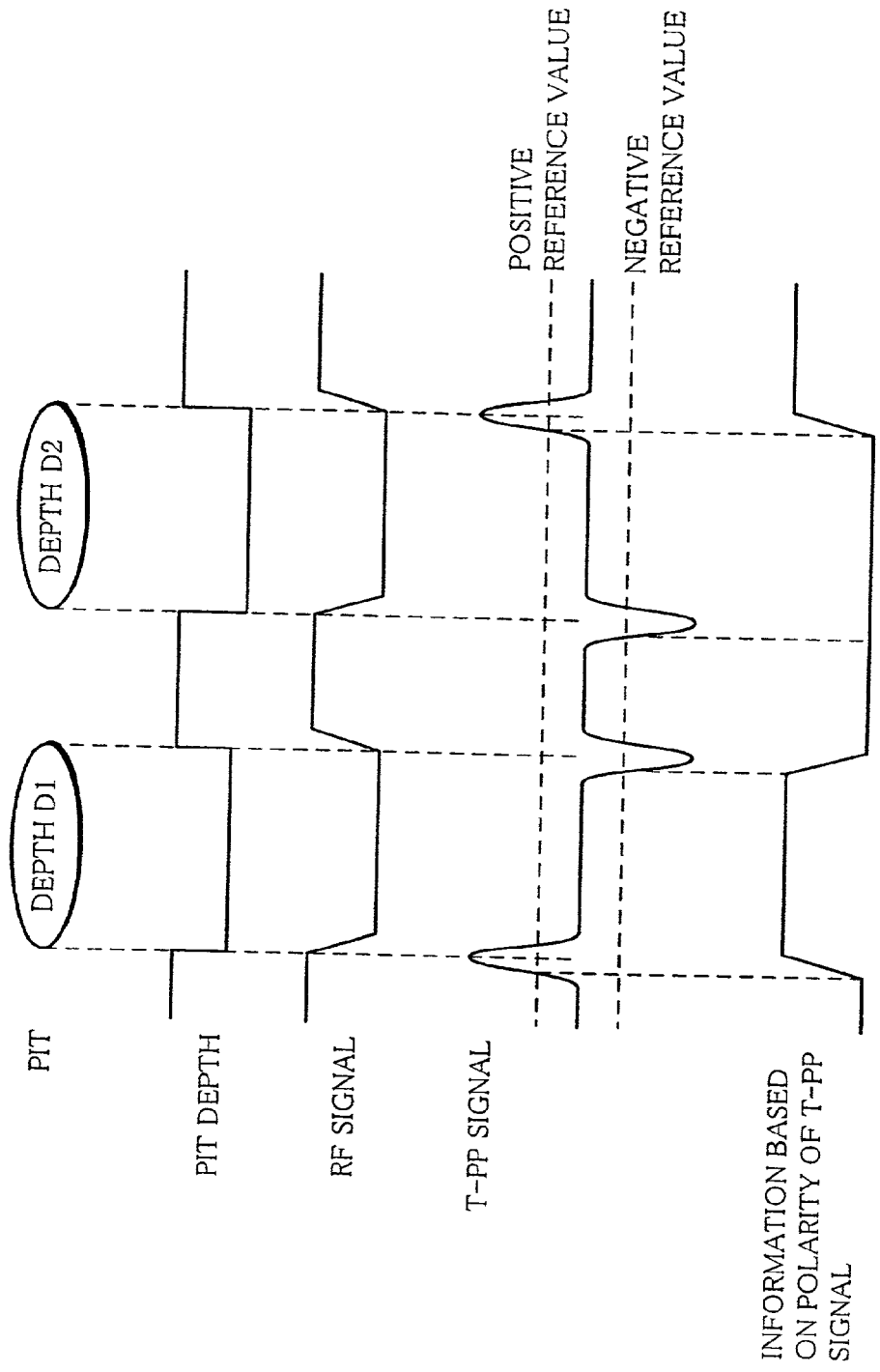
FIG. 6 is an explanatory drawing illustrating a change in RF signal accompanied by a change in the quantity of light incident on the photoreceptors, as affected by the diffraction of the light which is projected on the pit.

On the other hand, as shown in FIG. 6, T-PP signal is a signal which indicates a bias of the quantity of reflected light in the pit length direction (tangential direction) when the optical disk is irradiated with the light beam spot.

When the light beam spot cross an edge of the pit, a diffraction direction of the light biases to the pit length direction. The direction of bias becomes different, depending on whether the light is on the front edge or rear edge of the pit.

Thus, in finding a difference of output between the photoreceptors A and B, a pulse signal of different polarities at the front edge and rear edge of the pit is found.

However, the polarity of the signal at the front edge and rear edge of the pit depends on a pit depth.

As shown in FIG. 6, at pit depth D1 ($<\lambda/4n$), a positive pulse signal is generated at the front edge of the pit and a negative pulse signal is generated at the rear edge.

On the other hand, at pit depth D2 ($\lambda/4n<D2<\lambda/2n$) a positive pulse signal is generated at the rear edge of the pit and a negative pulse signal is generated at the front edge.

As shown in FIG. 6, a positive reference value and a negative reference value are set. These reference values are set so as to output [1] (high level) of binary logic if it is detected that T-PP signal is above the positive reference value, or [0] (low level) of binary logic if it is detected that T-PP signal is below the negative reference value. If this is regarded as the information based on the polarity of T-PP signal, the wave form of this information becomes clearly different from that of the RF signal.

Next, the digital watermarking technique is described below. The digital watermarking is the technique in which the watermark information meet the following conditions (a) through (e).

(a) watermark information is to be embedded in the main information (copyrighted information, here).

(b) watermark information is to be extracted by performing a certain process on the main information.

(c) watermark information is to be embedded so as not to be noticed by main information users.

(d) watermark information is not to be easily removed from the main information, and if removed, the main information suffers from damage which makes the main information unusable.

(e) watermark information is to remain even if it gets various attacks (for example, filtering process or compressing process).

As a method for embedding information by the digital watermarking technique, there is a method that performs computation to digital data which indicates color and brightness, etc., of image information.

As another method, for example, there is a method that embeds information by performing frequency conversion such as fast Fourier transform, discrete cosine transform, and wavelet transform, and after watermark information of image information is added to the frequency region, performing the corresponding reverse frequency conversion.

Information such as video and audio information that is an object of copyright protection is to be recorded in the optical disk according to the present invention. Note that, such information is recorded in a read only disk (that is, original disk called ROM) here.

For convenience of explanation, the main information indicates information such as video and audio information (information based on the quantity of reflected light), T-PP information indicates information based on the polarity of tangential push/pull signal, and watermark information indicates information embedded by the digital watermarking technique (copyright protection information).

In the above-mentioned read only disk, copyright protection information by the T-PP information and the main information embedded with the watermark Information are recorded.

Figure 1:
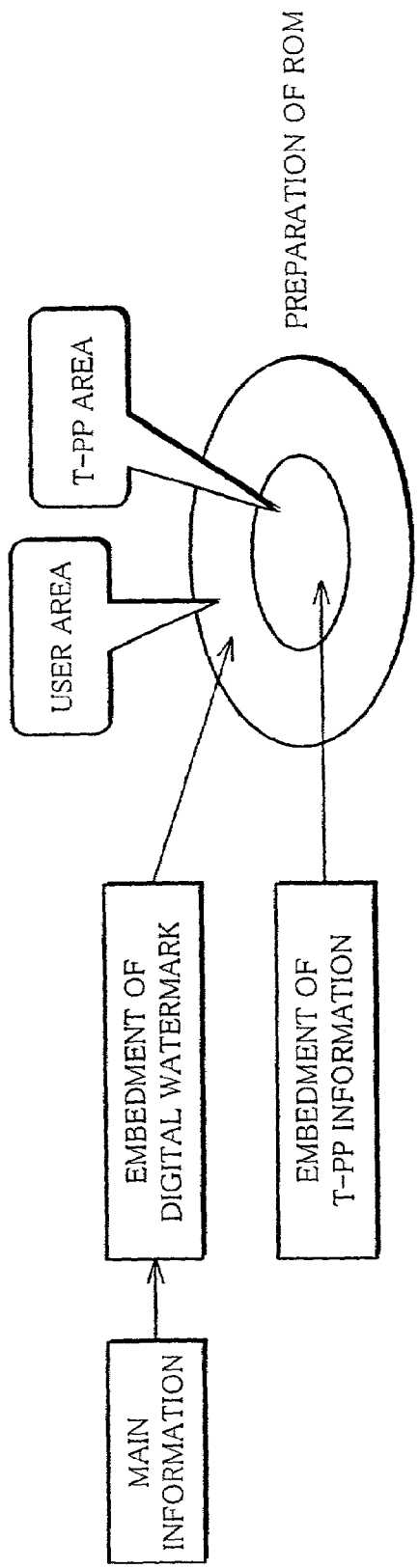
FIG. 1 is an explanatory drawing illustrating an optical disk of the present invention.

T-PP information records a signal indicating that the read only disk is the object of copyright protection, for example, in a specific T-PP area thereof (e.g., control area)(see FIG. 1).

In this area, the RF signal is recorded by pit length recording (for convenience of explanation, pit shape is constant), for example, by the recurring binary logic of [1] (high level) and [0] (low level) of a constant length. However, the T-PP information, which is recorded by changing the depth of pits by which the RF signal is recorded, is different from RF signal.

Figure 7:
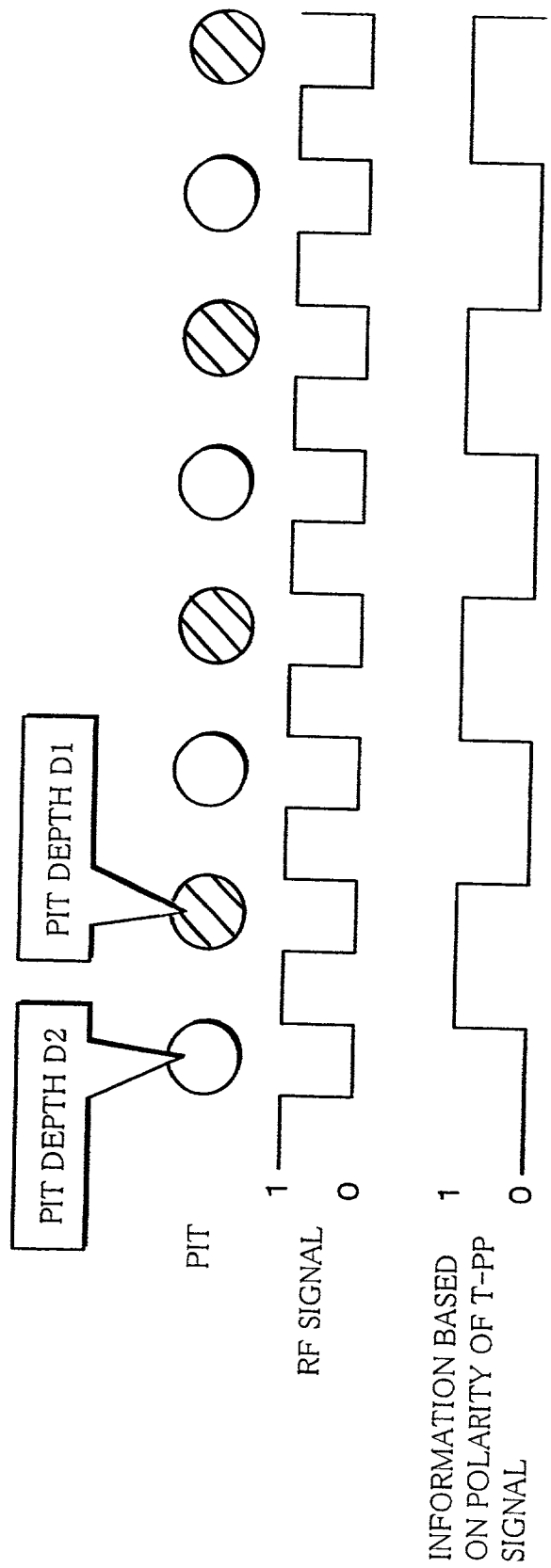
FIG. 7 is an explanatory drawing illustrating a relationship between recording pit line, RF signal, and T-PP information.

FIG. 7 shows examples of recording pit series, RF signal, and T-PP information. In FIG. 7, 0 indicates recording by pit depth D2 and *indicates recording by pit depth D1.

According to this example, the RF signal and the T-PP information have the following relationship.

That is, while the RF signal becomes [1], [0], [1] . . . , the T-PP information becomes [0], [0], [1], [1], [0], [0], [1], [1] . . .

In this manner, the RF signal and T-PP information are different from each other. In case where it is indicated that the main information is the object of copyright protection, it is possible to record the T-PP information differently from the RF signal.

Thus, recording the T-PP information as additional information makes it possible to prevent the recording capacity of main information from being decreased and to use recorded additional information effectively.

As shown in FIG. 1, main information is recorded by pit-length recording in which information is represented by the presence or absence of pits and pit length, by forming pits in the user area of a read only disk as represented by CD and DVD. Note that, the watermark information is embedded in the main information in order to indicate that the disk is the object of copyright protection.

The Watermark information is embedded in the following way. For example, the following information operation is performed when the main information is video information which is the object of copyright protection.

Two points (ai, bi) by pseudo-random number are selected from an image. Next, Yai, which is the brightness level of ai, is raised by constant value d, and Ybi, which is the brightness level of bi, is lowered by constant value d. Here, d is an integer of a range which does not cause information deterioration. This process is repeated for n times.

The following shows the method for detecting the watermark information. That is, two points of brightness level (Yai+d, Ybi−d) by pseudo-random number are extracted from the image at the same location as when the information was embedded. Then, the difference between the two points is calculated.

This procedure is performed for n times at each location and obtain the average of these values.

Watermark information is defined as being embedded if the average is d or more and defined as not being embedded if the average is less than d.

Here, the expected value of (Yai−Ybi) is assumed to be 0 (this assumption is based on the fact that two points randomly selected have the same brightness, leading the difference of 0). Therefore, the expected value of [(Yai+d)−(Ybi−d)] is 2 d. Thus, the threshold value d is used to make judgement.

This makes it possible to embed watermark information while suppressing deterioration of recorded information and conversely to detect watermark information.

Information is recorded in the read only disk in the described manner. FIG. 1 shows this flow.

Note that, the above explanation is an example of embedding and detecting watermark information. The present invention is not limited to this example and has only to meet the foregoing conditions (a) through (e).

Figure 8:
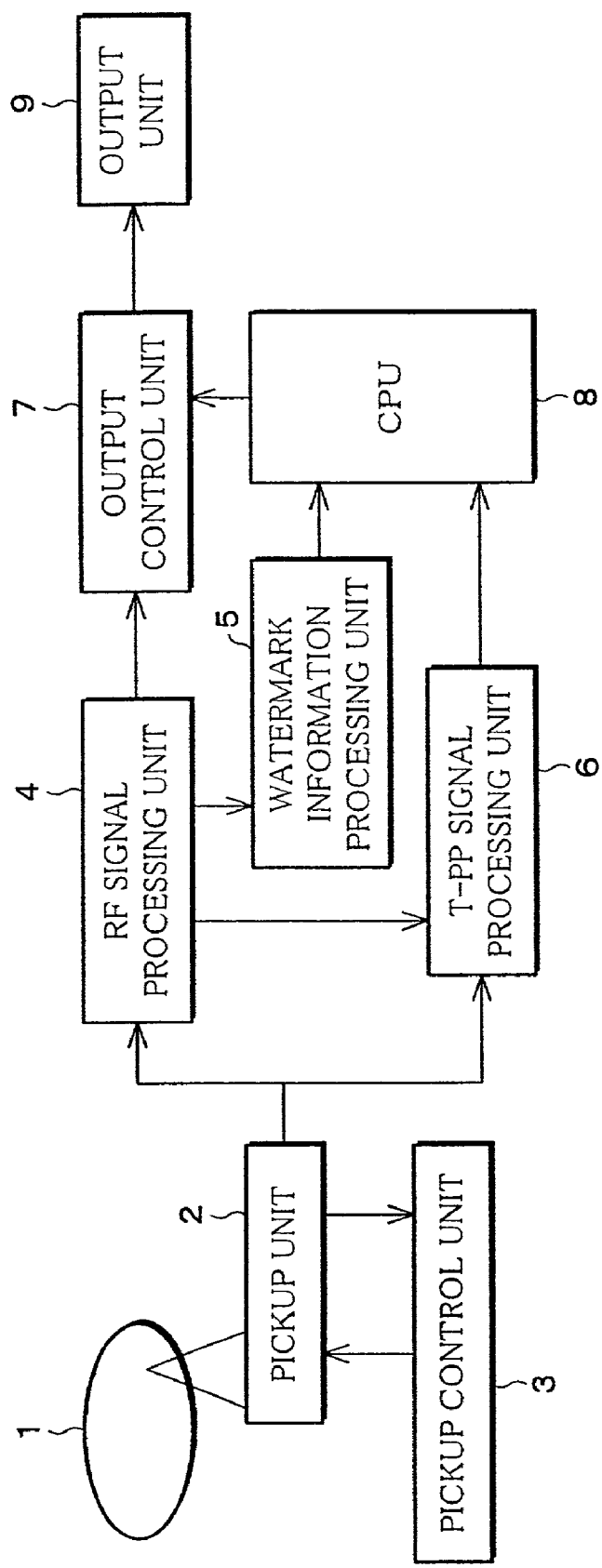
FIG. 8 is a block diagram showing an exemplary structure of a reproducing apparatus of the present invention.

Referring to FIG. 8, the reproducing apparatus of the present invention is now described. Note that, the reproducing apparatus shown here is also available for the reproducing section of a recording and reproducing apparatus.

In FIG. 8, reference numeral 1 is an optical disk loaded in the reproducing apparatus.

There are a total of five types of optical disk 1 (optical recording medium) available, including: copyrighted read only disk called ROM as described above, copyright-free read only disk, write once disk called R, and rewritable disk called RW, in addition to a ROM of pirated edition copied by unauthorized copying from a copyrighted ROM.

Reference numeral 2 indicates a pickup unit which reads out information recorded in the optical disk 1. The pickup unit is constructed by a laser diode, a laser diode driving circuit, an objective lens, an optical system, an actuator, a photoreceptor, etc. (none of these are shown).

The pickup unit 2 focuses a light beam from the laser diode on the optical disk 1 while following the tracks (not shown) on the optical disk 1. The reflected light is detected by the photoreceptor (for example, such as a photodetector which is made up of dichotomized photoreceptors A and B as shown in FIG. 5).

There are three signals which are detected by the photoreceptor: a signal for servo control of the pickup unit 2; a signal based on the quantity of reflected light from a pit, and a T-PP detecting signal.

Reference numeral 3 is a pickup control unit. The pickup control unit 3 amplifies, modifies, and processes the signal for servo control obtained from the pickup unit 2, so as to create a control signal which causes the pickup unit 2 to follow tracks and focus the light beam, and then output the control signal to the actuator of the pickup unit 2.

Reference numeral 4 is an RF signal processing unit, which processes the signal based on the quantity of reflected light from a pit obtained from the pickup unit 2.

The process includes obtaining the information reproducing signal, modulation, error correcting, etc., by binarization, equalization, and PLL. The information outputted from the RF signal processing unit 4 corresponds to the main information recorded on the optical disk 1.

Reference numeral 5 is a watermark information processing unit, which judges whether or not watermark information is embedded in the information reproduced by the RF signal processing unit 4.

Detection of watermark information is performed by the foregoing way. For prevention of redundancy, an explanation thereof is omitted here.

Reference numeral 6 is a T-PP signal processing unit, which processes T-PP detecting signal obtained from the pickup unit 2.

The content of this process is essentially the same as that of the RF signal processing unit 4, and the binalizing method is as described above. In the T-PP signal processing unit, it is judged whether or not T-PP signal is finally detected.

Reference numeral 7 is an output control unit, which switches to allow output of the signal from the RF signal processing unit 4 as a reproducing signal to the output unit 9, or disallow it.

A signal for switching is outputted from a CPU 8 which controls the whole system. In addition, a peripheral circuit such as memory (not shown in FIG. 8) is provided.

The output unit 9 transforms the signal from the RF signal processing unit 4 into a video signal and audio signal. The signal outputted from the output unit 9 is processed by display/speaker system, and the like so that we can listen and watch.

The method of judgement is now described below. It is assumed here that the T-PP information is recorded in a specific area (hereinafter "T-PP information area") on the optical disk 1, and the RF signal of [1] and [0] is recorded repeatedly in the constant pit-length.

If the output of RF signal is different from that of T-PP signal in the T-PP information area, it is regarded that the T-PP information is detected from the optical disk 1, thus judging that the main information recorded is the object of copyright protection.

On the other hand, if the output of RF signal is the same as that of T-PP signal, it is regarded that the T-PP information is not detected from the optical disk 1, thus judging that the main information recorded is not the object of copyright protection.

FIG. 9(a) is an explanatory drawing in case where the main information is the object of copyright protection. As shown in the drawing, pits having different pit depths D2 and D1 are recorded alternately.

[1010101010101010] is detected as RF signal from the T-PP information area on the optical disk 1.

On the other hand, [0011001100110011] is detected as T-PP information.

By comparing both information, it is found that the contents of both information do not agree. As a result, the T-PP signal processing unit 6 judges that T-PP information was detected from the optical disk 1.

FIG. 9(*b*) is an explanatory drawing in case where the main information is not the object of copyright protection. In this case, the main information is recorded all in pit depth D1.

[1010101010101010] is detected as RF signal from the T-PP information area on the optical disk 1.

On the other hand, [1010101010101010] is detected as T-PP information.

By comparing both information, it is found that the contents of both information agree. As a result, the T-PP signal processing unit 6 judges that T-PP information was not detected from the optical disk 1.

As described above, according to the optical disk 1 of the present invention, the pits are formed in a shape and a pit length of track direction according to the main information, and a depth according to the additional information.

That is, plural pits, formed on the optical disk 1, carry the main information and the additional information (information necessary for reproducing the main information).

Since the depth of each pit is formed according to the additional information, it is impossible to physically copy a pit depth to another recordable optical recording medium. That means, in case of unauthorized copy, the additional information of the depth is not detected (reproduced).

The pits include a first pit having depth D1 and a second pit having depth D2. It is preferable that the depth of the first pit is less than λ/4n, the depth of the second pit exceeds λ/4 n, where λ is the wavelength of a reproduction light beam, and n is the refractive index of the optical recording medium.

In this case, the polarities of the signal (tangential push/pull signal) which is detected when the reproduction light beam is projected become different at the front edge and the rear edge between the first pit and the second pit.

This is because the pit depth is different. In this manner, change in the pit depth makes it possible to record information in higher density.

Referring to Table 1, the relationship between the type of disk and the T-PP information and watermark information is described below.

That is, the T-PP information (copyright protection information by T-PP signal) and watermark information (copyright protection information by digital watermarking) are recorded on the copyrighted read only disk called ROM (regular ROM or original disk), but not on the copyright-free disk.

With this, since the T-PP information cannot be copied to the disk of pirated edition (write once disk and rewritable disk) which is produced by unauthorized copying from the copyrighted ROM, the T-PP information is not recorded thereon. However, watermark information is copied and recorded thereon.

In addition, neither the T-PP information nor watermark information is recorded on the disk which was not copied by unauthorized copying (write once disk and rewritable disk).

The relationship as described above (Table 1) is stored in advance in a memory (not shown) so that CPU 8 can access to the memory.

TABLE 1

| TYPE OF DISK | DETECTION OF T-PP INFORMATION | DETECTION OF WATERMARK INFORMATION |
|---|---|---|
| ORIGINAL DISK | ○ | ○ |
| COPYRIGHT-FREE DISK | X | X |
| DISK OF PIRATED EDITION | X | ○ |
| WRITE ONCE DISK | X | X |
| REWRITABLE DISK | X | X |

In the reproducing apparatus (system), a method for restricting reproduction with respect to the disk of pirated edition is described below.

Figure 2:
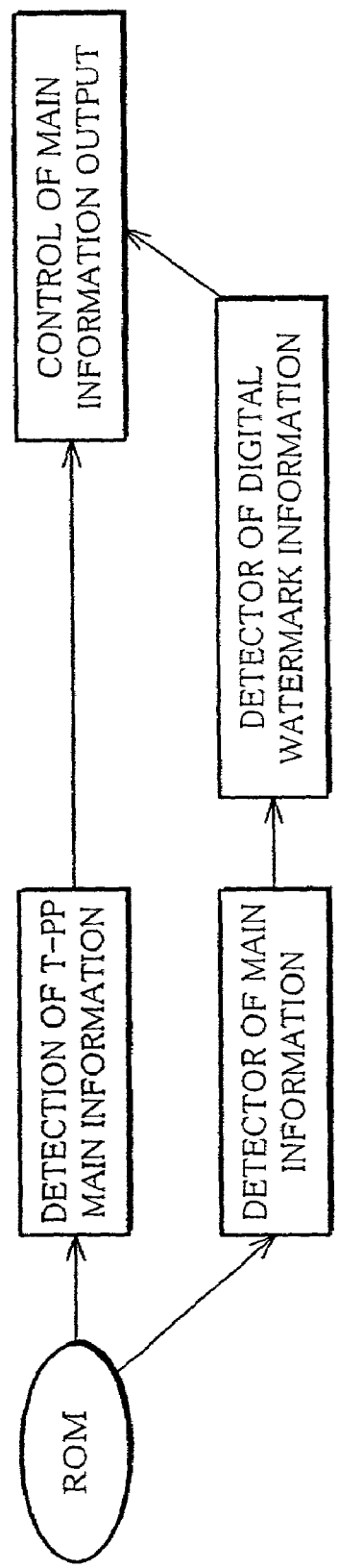
FIG. 2 is an explanatory drawing illustrating the outline of restricting a reproducing process.

FIG. 2 is an explanatory drawing illustrating the outline of restricting a reproducing process.

Figure 3:
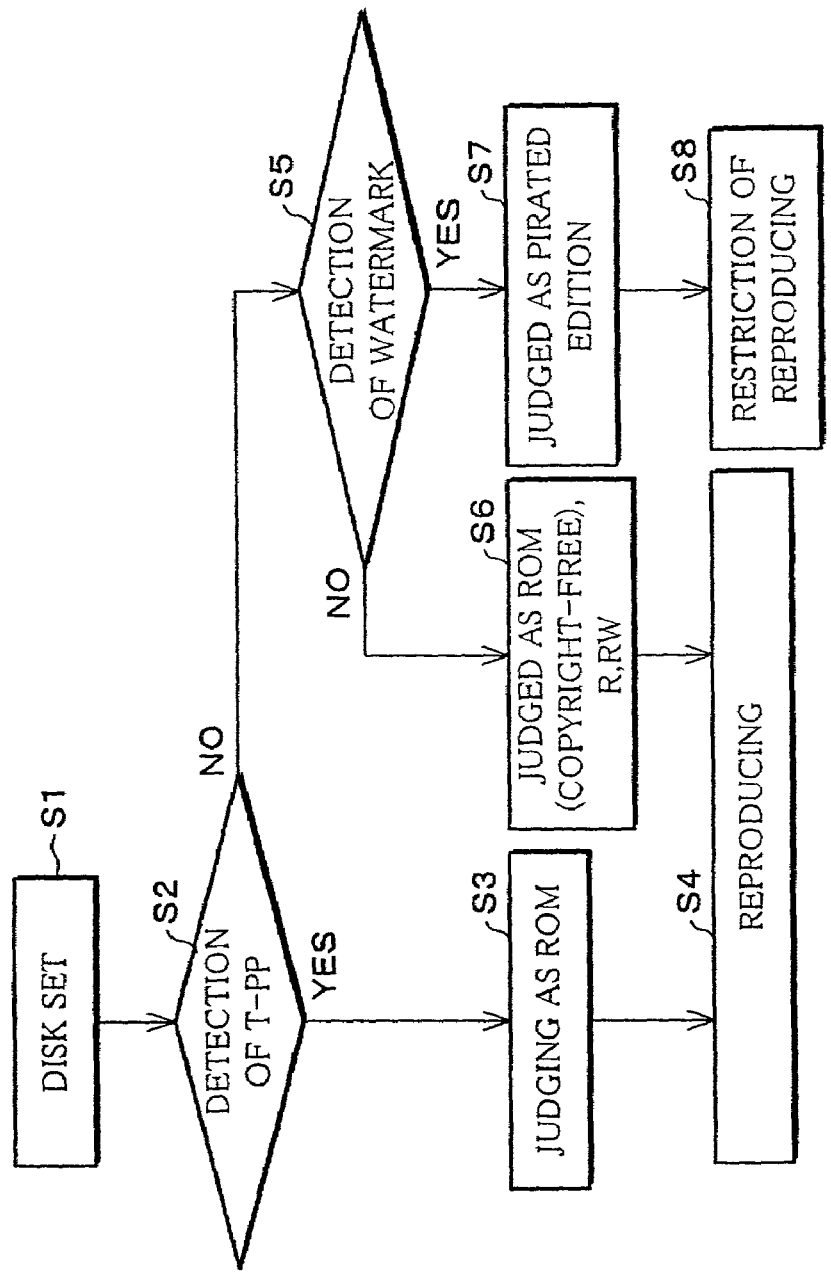
FIG. 3 is a flowchart illustrating a process flow of restricting reproduction with respect to the optical disk.

FIG. 3 is a flowchart illustrating a process flow.

The optical disk to be reproduced is loaded and set in the reproducing apparatus (S1). Then, the pickup unit 2 moves to the T-PP information recording area in order to judge whether or not the T-PP information is recorded on the optical disk.

After that, according to the above method, it is judged whether or not the T-PP information is recorded on the optical disk, and the result of judgement is transferred to the CPU 8 (S2).

When it is judged in S2 that the T-PP information is detected (reproduced), the CPU 8 judges that the optical disk which has been loaded is a copyrighted ROM (original disk) according to Table 1 (S3).

The output control unit 7 which has received the main information from the RF signal processing unit 4 transfers the main information to the output unit 9 without restricting the main information. This enables the information recorded in the optical disk to be reproduced (S4).

On the other hand, when it is judged in S2 that the T-PP information is not detected (reproduced), the watermark information processing unit 5 receives the main information from the output of RF signal processing unit 4, and according to the above method, judges whether or not watermark information is recorded on the optical disk, and the result of judgement is transferred to the CPU 8 (S5).

When it is judged that watermark information is not detected, the CPU 8 judges that the optical disk which has been loaded is the copyright-free disk, write once disk, or rewritable disk (S6).

In this case, the output control unit 7 which has received the main information from the RF signal processing unit 4 transfers the main information to the output unit 9 without restricting the main information. This enables the information recorded in the optical disk to be reproduced (S4).

When it is judged in S5 that watermark information is detected (reproduced), the CPU 8 judges that the disk which has been loaded is the disk of pirated edition according to Table 1 (S7).

In this case, the output control unit 7 which has received the main information from the RF signal processing unit 4 receives a reproduction control signal from the CPU 8 and restricts transfer of the main information to the output unit 9.

Reproduction may be restricted, for example, by way of not performing reproduction at all, restricting a reproducing time period, or reproducing data with poor image quality. Alternatively, a warning may be displayed on a display screen against users.

Figure 10:
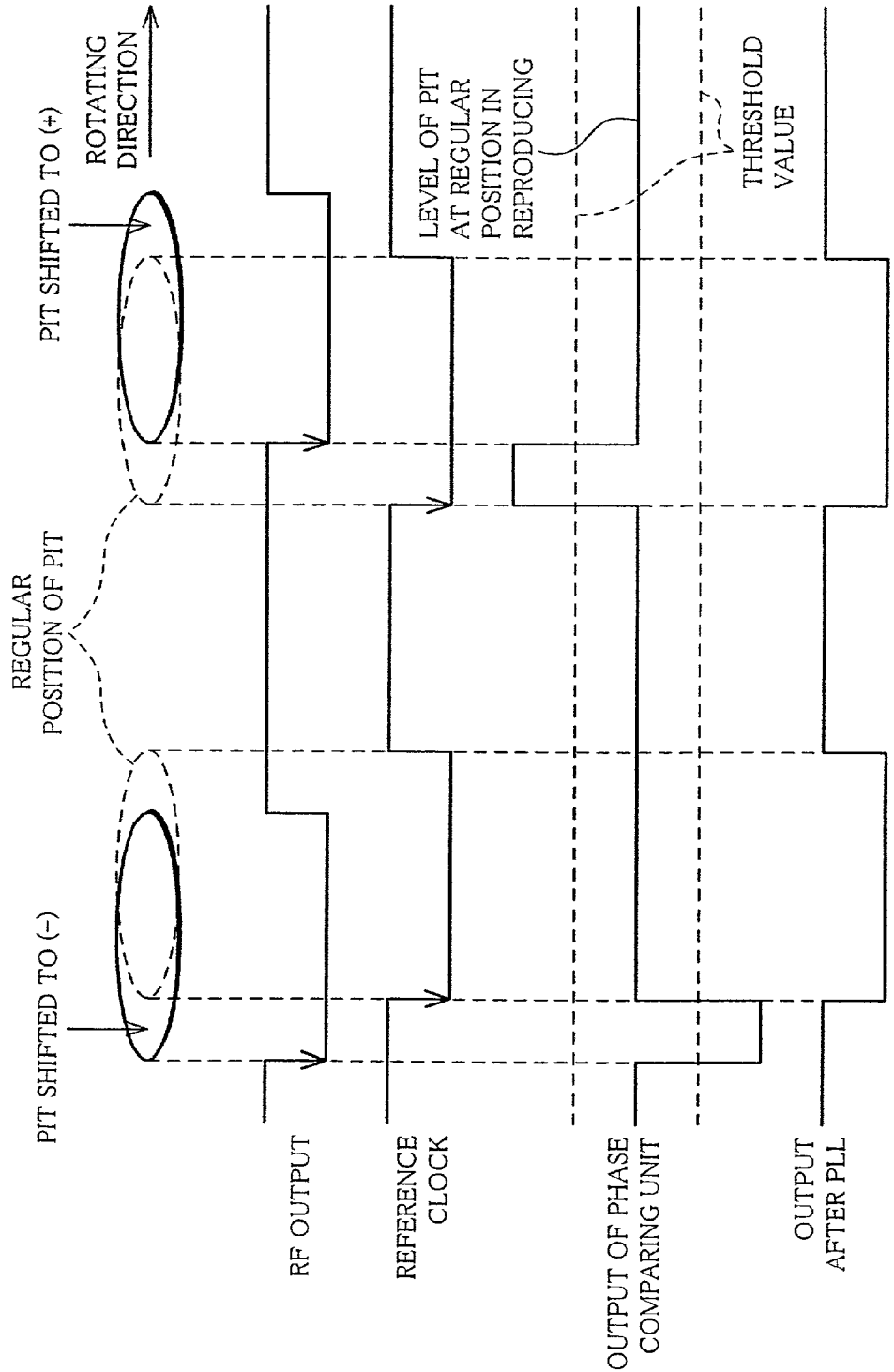
FIG. 10 is an explanatory drawing illustrating another embodiment according to the present invention.

Referring to FIG. 10, another embodiment of the present invention is described below.

In this embodiment, instead of using the T-PP signal, the pit position to record the main information is shifted from a regular pit position in track directions. The shift is made according to the additional information. Here, each pit has the same depth.

Also in this case, since the pit is formed at a shifted position from a regular pit position in track directions, it is impossible to physically copy the pit shift to another recordable optical recording medium. That means, in case of unauthorized copying, the additional information by the shift from the regular pit position (regular position) is not detected (reproduced).

As shown in FIG. 10, with respect to the optical disk used in the present embodiment, a pit to record information is recorded at a position slightly shifted from a regular pit position (regular position) in track directions.

In reproducing the optical disk, the phase of the output of the RF signal is shifted by a large margin with respect to that of the reference clock when a PLL circuit (not shown) which takes synchronization of the reproducing signal and reference clock reproduces a pit which has been recorded by being slightly shifted with respect to the regular position in a track direction and when the PLL circuit processes the pit which has been recorded at a shifted position. Thus, in this case, the output of a phase comparing unit (not shown) becomes larger than that from the pit which has been recorded at the regular position.

For example, the output of the phase comparing unit becomes large in (+) direction in the case of a pit slightly shifted from the regular position in the rotating direction, whereas the output of the phase comparing unit becomes large in (−) direction in the case of a pit slightly shifted from the regular position in the reverse rotating direction.

Generally, by setting a threshold value between the output of a pit (pit recorded at a regular position) in reproducing and the output of a pit which has been recorded at a slightly shifted position in the track direction in reproducing, it is possible to detect the pit which has been recorded intentionally at a shifted position. That is, it is possible to record hidden information in the (+) and (−) directions.

On the other hand, if copying of information in the optical disk to another recordable disk is attempted, the pit which has been recorded at a position slightly shifted from a regular position in the track direction is forced to change into a signal in synchronism with a reference clock by the processing (operation) of the PLL circuit. with this, it is impossible to copy the pit which has been recorded at a position slightly shifted from a regular position in the track direction to another recordable disk.

In other words, information of the pit which has been recorded at a position slightly shifted from a regular position in the track direction cannot be detected from the recordable disk which has attempted to copy the information.

The reproducing apparatus according to the present embodiment can be realized by providing a pit position detecting unit instead of the T-PP signal processing unit 6 of FIG. 8 (other structure is the same as that of FIG. 8).

Further, the flow of FIG. 3 using the T-PP signal can be used as well for judging whether or not the disk is the object of copyright protection, by changing S2 from "whether or not T-PP information is recorded" to "whether or not a pit which has been shifted intentionally is detected".

As described above, according to the optical disk of the present embodiment, if unauthorized copying of an optical recording medium in which a pit is formed at a position shifted from a regular position in the track direction to another recordable optical recording medium is attempted, the pit which has been formed at a shifted position is forced to change into a signal in synchronism with a reference clock.

As a result, the pit which has been formed at a shifted position cannot be recorded. Therefore, information associated with the shifted pit cannot be detected from the optical recording medium by unauthorized copying.

Detecting information associated with a pit is described as follows. That is, in reproducing the optical recording medium in which a pit has been formed at a regular pit position, the reproducing signal is synchronized with the reference clock. Therefore, there is almost no phase shift between the reproducing signal and the reference clock.

Conversely, in reproducing the optical recording medium in which a pit has been formed at a position shifted from a regular pit position in the track direction, a phase shift between the reproducing signal and the reference clock becomes large.

For example, if it is detected that such a phase shift exceeds a predetermined value (threshold value), it can be judged that the optical recording medium in reproducing is the one in which a pit has been formed at a position shifted from a regular position in the track direction.

On the other hand, if detected a phase shift is at or below a predetermined value, it can be judged that the optical recording medium in reproducing is the one in which a pit has been formed at a regular position.

In addition, copyright protection information by digital watermarking is embedded in the main information. In copying to another recordable optical recording medium, the copyright protection information is copied as it is. That is, in case of unauthorized copy, this copyright protection information is detected.

As described above, in case of unauthorized copy, the additional information associated with the shift is not detected even if this optical recording medium is reproduced, whereas copyright protection information embedded in the main information is detected.

Therefore, on the basis of this detection result, it is possible to judge accurately whether or not the optical recording medium is the one by unauthorized copying.

Figure 11:
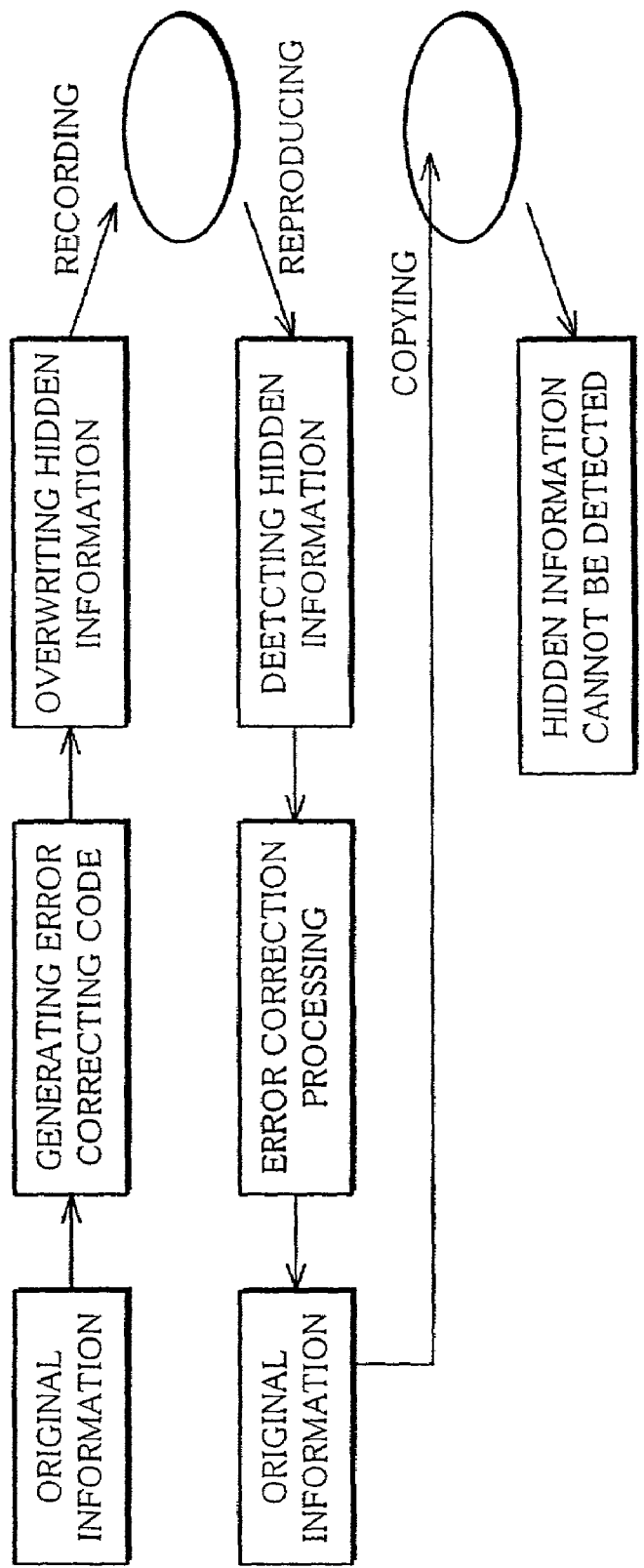
FIG. 11 is an explanatory drawing illustrating yet another embodiment according to the present invention.

Referring to FIG. 11, a further embodiment of the present invention is described below.

The present embodiment describes the case utilizing error correction, instead of the T-PP signal.

Typically, information in a disk is recorded by the unit of ECC block. In this embodiment, after an error correcting code of one ECC block is generated for original data, hidden information is written over the original information of one or more predetermined location (region) in the ECC block.

Here, it is required that the error correcting code is not changed and the hidden information is overwritten only to the extent where it does not exceed the error correcting ability. Also, the copyright protection information is embedded in the main information before the error correcting code is generated.

The information completed in such way is recorded as the main information on the disk. In reproducing this disk, data of one or more predetermined location in ECC block is read out. If it is confirmed that the data is hidden information, the disk is judged to be the original one.

On the other hand, if copying this disk to another recordable recording medium is attempted, the error correction in reproducing turns hidden information which has been overwritten in the ECC block back to the original information on the basis of the error correcting code.

With this, the hidden information is not detected (reproduced) from this another recordable disk which has copied the information converted back to the original information. FIG. 11 shows a schematic flow of this process.

The reproducing apparatus according to the present embodiment can be realized by providing a hidden information detecting unit instead of the T-PP signal processing unit 6 of FIG. 8 (other structure is the same as that of FIG. 8).

The flow of FIG. 3 using the T-PP signal can be used as well for judging whether or not the disk is the object of copyright protection, by changing S2 from "whether or not T-PP information is recorded" to "whether or not hidden information is detected".

In the optical disk according to the present embodiment, the information in plural predetermined regions in the error correcting block, which is the main information corresponding to the error correcting code, is changed and recorded as main information in the form of pits, and copyright protection information is embedded in the main information by digital watermarking.

In this case, the information in plural predetermined regions in the error correcting block, which is the main information corresponding to the error correcting code, is changed and recorded in the form of pits. Note that, the error correcting code is not changed.

In this manner, if unauthorized copying of the optical recording medium including main information in which information in plural predetermined regions has been changed without changing the error correcting code to another recordable optical medium is attempted, the main information so changed in the error correction code block is subjected to error correction in reproducing so that the content of the information in plural predetermined regions is converted back to the original information before the change.

Thus, the main information which has been turned back to the original information before the change is copied to the optical recording medium by unauthorized copying. Therefore, the information which has been changed in the foregoing manner cannot be detected from the optical recording medium by unauthorized copying.

In addition, if the optical recording medium including the main information in which information in the plural predetermined regions has been changed is reproduced, the information which has been changed is detected as it is. Therefore, it is possible to judge that this optical recording medium is not the one by unauthorized copying.

On the other hand, copyright protection information is embedded in the main information by digital watermarking. In copying to another recordable optical recording medium, the copyright protection information is copied as it is. That is, in case of unauthorized copy, this copyright protection information is detected.

As described above, in case of reproducing the optical recording medium which was made by unauthorized copying, the main information in which information in the plural predetermined regions has been changed is not detected, whereas the copyright protection information embedded in the main information is detected.

Therefore, on the basis of this detecting result, it is possible to judge accurately whether or not the optical recording medium is the one by unauthorized copying.

It is preferable that in another optical recording medium according to the present invention in which main information, and additional information required for reproducing the main information are recorded, wherein: the additional information is formed by pit, a depth of pits being formed according to the additional information, and copyright protection information by digital watermarking is embedded in the main information.

According to this invention, the optical recording medium carries the main information and the additional information. The additional information is the information required to reproduce the main information.

Since the depth of each pit carrying the additional information is formed according to the additional information, the pit depth cannot be copied to another recordable optical recording medium. That means, in case of unauthorized copy, the additional information according to this pit depth is not detected; therefore, the optical recording medium by unauthorized copying cannot be reproduced properly.

On the other hand, the copyright protection information is embedded in the main information by digital watermarking. In copying to another recordable optical recording medium, the copyright protection information is copied as it is. That is, in case of unauthorized copy, the copyright protection information is detected.

As described above, in case of unauthorized copy, even if this optical recording medium is reproduced, the additional information according to the pit depth is not detected, whereas copyright protection information embedded in the main information is detected. Therefore, this result of detection makes it possible to judge accurately whether or not the optical recording medium is the one by unauthorized copying.

The pits include a first pit having a first depth and a second pit having a second depth. When a wavelength of a reproduction light beam is $\lambda$ and a refractive index of optical recording medium is n, preferably, the first depth is less than $\lambda/4n$, the second depth exceeds $\lambda/4n$.

In this case, in the first pit and the second pit, the polarities of the signal (tangential push/pull signal) which is detected when the reproduction light beam is projected become different at the front edge and rear edge of the pit. This is because the pit depth is different.

In this manner, a change in the pit depth makes it possible to record information in higher density.

It is preferable that in further other optical recording medium according to the present invention in which main information, and additional information required for reproducing the main information are recorded, wherein: the additional information is formed by pits, all of the pits have an equal depth and are formed at a position shifted from a regular pit position in a track direction according to the additional information, and copyright protection information by digital watermarking is embedded in the main information.

According to this invention, since the pit carrying the additional information is formed at a position shifted from a regular pit position in the track direction, it is impossible to physically copy shifted pit to another recordable optical recording medium.

That means, in case of unauthorized copying, the additional information associated with the shift from this regular pit position is not detected; therefore, the optical recording medium by unauthorized copying cannot be reproduced properly.

If unauthorized copying of an optical recording medium in which a pit is formed at a position shifted from a regular position in the track direction to another recordable optical recording medium is attempted, the pit which has been formed at the shifted position is forced to change into a signal in synchronism with a reference clock.

As a result, recording of the pit which has been formed at the shifted position cannot be performed. Therefore, information associated with the shifted pit cannot be detected from the optical recording medium which was made by unauthorized copying.

Detecting information associated with a pit is described as follows. That is, in reproducing the optical recording medium in which a pit has been formed at a regular pit position, the reproducing signal is synchronized with the reference clock. Therefore, there is almost no phase shift between the reproducing signal and the reference clock.

Conversely, in reproducing the optical recording medium in which a pit has been formed at a position shifted from a regular pit position in the track direction, a phase shift between the reproducing signal and the reference clock becomes large.

For example, if it is detected that such a phase shift exceeds a predetermined value (threshold value), it can be judged that the optical recording medium in reproducing is the one in which a pit has been formed at a position shifted from a regular position in the track direction. On the other hand, if detected a phase shift is at or below a predetermined value, it can be judged that the optical recording medium in reproducing is the one in which a pit has been formed at a regular position.

In addition, copyright protection information by digital watermarking is embedded in the main information. In copying to another recordable optical recording medium, the copyright protection information is copied as it is. That is, in case of unauthorized copy, this copyright protection information is detected.

As described above, in case of unauthorized copy, the additional information associated with the shift is not detected even if this optical recording medium is reproduced, whereas copyright protection information embedded in the main information is detected. Therefore, on the basis of this detection result, it is possible to judge accurately whether or not the optical recording medium is the one by unauthorized copying.

It is preferable that in yet another optical recording medium according to the present invention in which an error correcting code with respect to main information is provided in the form of pits by a unit of error correcting code block, wherein: information in plural predetermined regions in the error correcting block, which is the main information corresponding to the error correcting code, is changed and recorded as the main information, and copyright protection information by digital watermarking is embedded in the main information.

According to this invention, the error correcting code with respect to the main information is provided in the form of pits by the unit of error correcting code block.

In this case, the information in plural predetermined regions in the error correcting block, which is the main information corresponding to the error correcting code, is changed and recorded in the form of pits. Note that, the error correcting code is not changed.

In this manner, if unauthorized copying of the optical recording medium including main information in which information in plural predetermined regions has been changed without changing the error correcting code to another recordable optical medium is attempted, the main information so changed in the error correction code block is subjected to error correction in reproducing so that the content of the information in plural predetermined regions is converted back to the original information before the change.

Thus, the main information which has been turned back to the original information before the change is copied to the optical recording medium by unauthorized copying. Therefore, the information which has been changed in the foregoing manner cannot be detected from the optical recording medium by unauthorized copying.

In addition, if the optical recording medium including the main information in which information in the plural predetermined regions has been changed is reproduced, the information which has been changed is detected as it is. Therefore, it is possible to judge that this optical recording medium is not the one by unauthorized copying.

On the other hand, copyright protection information is embedded in the main information by digital watermarking. In copying to another recordable optical recording medium, the copyright protection information is copied as it is. That is, in case of unauthorized copy, this copyright protection information is detected.

As described above, in case of reproducing the optical recording medium which was made by unauthorized copying, the main information in which information in the plural predetermined regions has been changed is not detected, whereas the copyright protection information embedded in the main information is detected. Therefore, on the basis of this detecting result, it is possible to judge accurately whether or not the optical recording medium is the one by unauthorized copying.

According to a reproducing apparatus of the present invention, it is preferable that the reproducing apparatus comprises: reproducing means for reproducing an optical recording medium which has been loaded; and reproduction restricting means for judging that the optical recording medium which has been loaded is the one by unauthorized copying, so as to restrict reproduction by said reproducing means, when the optical recording medium reproduced by said reproducing means is an optical recording medium in which main information, and additional information required for reproducing the main information are recorded, the additional information being physically formed, the main information being embedded with copyright protection information by digital watermarking, and when said reproducing means does not reproduce the additional information and reproduces the copyright protection information.

According to a reproducing apparatus of the present invention, it is preferable that the reproducing apparatus comprises: reproducing means for reproducing an optical recording medium which has been loaded; and reproduction restricting means for judging that the optical recording medium which has been loaded is the one by unauthorized copying, so as to restrict reproduction by said reproducing means, when the optical recording medium reproduced by said reproducing means is an optical recording medium in which main information, and additional information required for reproducing the main information are recorded, the additional information being formed by pits, a depth of the pits being formed according to the additional information, the main information being embedded with copyright protection information by digital watermarking, and when said reproducing means does not reproduce the additional information and reproduces the copyright protection information.

According to a reproducing apparatus of the present invention, it is preferable that the reproducing apparatus comprises: reproducing means for reproducing an optical recording medium which has been loaded; and reproduction restricting means for judging that the optical recording medium which has been loaded is the one by unauthorized copying, so as to restrict reproduction by said reproducing means, when the optical recording medium reproduced by said reproducing means is an optical recording medium in which main information, and additional information required for reproducing the main information are recorded, the additional information being formed by pits, a depth of the pits being formed according to the additional information, the main information being embedded with copyright protection information by digital watermarking, the pits further including a first pit having a first depth and a second pit having a second depth, the first depth being less than $\lambda/4n$ and the second depth exceeding $\lambda/4n$ where $\lambda$ is a wavelength of a reproduction light beam and n is a refractive index of the optical recording medium, and when said reproducing means does not reproduce the additional information and reproduces the copyright protection information.

According to a reproducing apparatus of the present invention, it is preferable that the reproducing apparatus comprises: reproducing means for reproducing an optical recording medium which has been loaded; and reproduction restricting means for judging that the optical recording medium which has been loaded is the one by unauthorized copying, so as to restrict reproduction by said reproducing means, when the optical recording medium reproduced by said reproducing means is an optical recording medium in which main information, and additional information required for reproducing the main information are recorded, the additional information being formed by pits, all of the pits having an equal depth and being formed at a position shifted from a regular pit position in a track direction according to the additional information, the main information being embedded with copyright protection information by digital watermarking, and when said reproducing means does not reproduce the additional information and reproduces the copyright protection information.

According to this invention, since the additional information in the optical recording medium is formed physically (in the form of the pit depth or by being shifted from a regular pit position in the track direction), copying to another recordable optical recording medium cannot be performed.

On the other hand, copyright protection information is embedded in the main information by digital watermarking. In copying to another recordable optical recording medium, the copyright protection information is copied as it is. That is, in case of unauthorized copying, this copyright protection information is detected.

As described above, in case of unauthorized copying, even when the optical recording medium by unauthorized copying is reproduced, the additional information formed physically is not reproduced, whereas the copyright protection information is reproduced.

In this case, the reproduction restricting means judges that the optical recording medium is the one which has been copied by unauthorized coping, and restricts reproduction by the reproduction restricting means. As a result, reproduction of the optical recording medium which has been copied by unauthorized copying is restricted.

Reproduction may be restricted, for example, by way of not performing reproduction at all, restricting a reproducing time period, or reproducing data with poor image quality.

Note that, with respect to copyrighted optical recording media, copyright-free write once and rewritable type optical recording media, reproduction is carried out as a regular reproducing apparatus.

In this manner, in case of unauthorized copying, reproduction is restricted. Therefore, even if unauthorized copying is attempted on the basis of data which was created by encoding images delivered on a screen, a desired copy cannot be obtained because the image is given restriction.

That is, according to the above reproducing apparatus, it is possible to prohibit recording and reproducing of unauthorized copies based on encoded data, and to reproduce write once and rewritable optical recording medium which are not subject to copyright protection.

According to another reproducing apparatus of the present invention, it is preferable that the reproducing apparatus comprises: reproducing means for reproducing an optical recording medium which has been loaded; and reproduction restricting means for judging that the optical recording medium which has been loaded is the one by unauthorized copying, so as to restrict reproduction by said reproducing means, when the optical recording medium reproduced by said reproducing means is an optical recording medium in which an error correcting code with respect to main information is provided in the form of pits by a unit of error correcting block, information in plural predetermined regions in the error correcting block, which is the main information corresponding to the error correcting code, being changed and recorded as the main information, the main information being embedded with copyright protection information by digital watermarking, and when said reproducing means does not detect a change in the information in the plural predetermined regions and reproduces the copyright protection information.

According to the above invention, with respect to optical recording medium, the main information in which information in the plural predetermined regions has been changed without changing the error correcting code cannot be copied to another recordable optical recording medium by unauthorized copying.

That is, from the optical recording medium copied by unauthorized copying, the information which has been changed in the main information is not reproduced, but copyright protection information is reproduced as it is.

If optical recording medium which was made by unauthorized copying is loaded and reproduced, the main information in which information in the plural predetermined regions has been changed is not detected, whereas the copyright protection information embedded in the main information is reproduced.

In this case, the reproduction restricting means judges that the optical recording medium is the one which has been copied by unauthorized coping and restricts reproduction by the reproduction restricting means. As a result, reproduction of the optical recording medium which has been copied by unauthorized copying is restricted.

Reproduction may be restricted, for example, by way of not performing reproduction at all, restricting a reproducing time period, or reproducting data with poor image quality.

On the other hand, with respect to copyrighted optical recording media, copyright-free write once and rewritable type optical recording media, reproduction is carried out as a regular reproducing apparatus.

In this manner, in case of unauthorized copying, reproduction is restricted. Therefore, even if unauthorized copying is attempted on the basis of data which was created by encoding images delivered on a screen, a desired copy cannot be obtained because the image is given restriction.

That is, according to the above reproducing apparatus, it is possible to prohibit recording and reproducing of unauthorized copies based on encoded data, and to reproduce write once and rewritable optical recording medium which are not subject to copyright protection.

Also, the present invention can be described as below.

A first optical disk according to the present invention may be adapted to include a region where information is recorded in the form of pits of the same or different pit depth, and first information based on the quantity of reflected light from the pits and second information different from the first information obtained from the pits, wherein information by digital watermarking is embedded in the first information based on the quantity of reflected light from the pits, copyright information is protected based on the first and the second information.

In a second optical disk according to the present invention, it is preferable in the first optical disk that the pits have different depths, one below $\lambda/4n$ and above $\lambda/4n$, where $\lambda$ is a wavelength of a reproduction light beam and n is a refractive index of optical recording medium, and the second information is recorded using the pits having these two kinds of depths.

In a third optical disk according to the present invention, it is preferable in the first optical disk that the pits have the same depth, and the second information is recorded by changing the position of the pit arbitrarily with respect to the position where a signal in synchronism with a predetermined clock can be obtained.

In a fourth optical disk according to the present invention, it is preferable in the first optical disk that the information which is obtained on the basis of the quantity of reflected light from the pits includes the second information in which predetermined information is written over plural predetermined original information without changing the error correcting code.

Further, it is preferable that a first reproducing apparatus according to the present invention, for reproducing the second optical disk, comprises: detecting means for detecting the first information based on the quantity of reflected light from the pit; detecting means for detecting the second information which is based on the polarity of a tangential push/pull signal obtained from the pit; detecting means for detecting digital watermark information embedded in the information which is based on the quantity of reflected light from the pit; and restricting means for restricting reproduction of the information which is based on the quantity of reflected light from the pit on the basis of the detecting result of the detecting means.

It is preferable that a second reproducing apparatus according to the present invention, for reproducing the third optical disk, comprises: detecting means for detecting the first information based on the quantity of reflected light from the pit; detecting means for detecting the second information which is the signal obtained when the signal from the pit is subjected to the PLL process; detecting means for detecting digital watermark information embedded in the information which is based on the quantity of reflected light from the pit; and restricting means for restricting reproduction of the information which is based on the quantity of reflected light from the pit on the basis of the detecting result of the detecting means.

It is preferable that a third reproducing apparatus according to the present invention, for reproducing the fourth optical disk, comprises: detecting means for detecting the first information based on the quantity of reflected light from the pit; detecting means for detecting the second information which is the signal made up of plural predetermined information included in the information obtained from the pit; detecting means for detecting digital watermark information embedded in the information which is based on the quantity of reflected light from the pit; and restricting means for restricting reproduction of the information which is based on the quantity of reflected light from the pit on the basis of the detecting result of the detecting means.

It is preferable that a first reproducing method according to the present invention, for reproducing the second optical disk, comprises: a first step of detecting the second information based on the polarity of a tangential push/pull signal obtained from the pit; a second step of detecting digital watermark information embedded in the first information which is based on the quantity of reflected light from the pit; a third step of judging whether or not the optical disk is by unauthorized copying on the basis of the result of the first and the second steps; and a fourth step of restricting reproduction of the optical disk when the optical disk was judged to be made by unauthorized copying.

It is preferable that a second reproducing method according to the present invention, for reproducing the third optical disk, comprises: a first step of detecting the second information which is the signal obtained when the signal from the pit is subjected to the PLL process; a second step of detecting digital watermark information embedded in the first information which is based on the quantity of reflected light from the pit; a third step of judging whether or not the optical disk is by unauthorized copying on the basis of the result of the first and the second steps; and a fourth step of restricting reproduction of the optical disk when the optical disk was judged to be made by unauthorized copying.

It is preferable that a third reproducing method according to the present invention, for reproducing the fourth optical disk, comprises: a first step of detecting the second information which is the signal made up of plural predetermined information included in the information obtained from the pit; a second step of detecting digital watermark information embedded in the first information which is based on the quantity of reflected light from the pit; a third step of judging whether or not the optical disk is by unauthorized copying on the basis of the result of the first and the second steps; and a fourth step of restricting reproduction of the optical disk when the optical disk is judged to be made by unauthorized copying.

The present invention makes it possible to accurately find the disk of pirated edition which has been made by unauthorized copying of a copyrighted disk to another recordable disk, and to restrict the reproduction of the disk which was made by unauthorized copying, which can prevent infringement of copyright effectively. Conversely, it is possible to find the disk in which copyright-free information is recorded, so that no restriction of reproducing is given to the disk. In addition, it is possible to prohibit recording and reproducing of unauthorized copies which are based on encoded data.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An optical recording medium, wherein
main information is recorded on the optical recording medium, the main information having digital watermarking embedded therein, such that copying of the main information also copies the digital watermarking, the digital watermarking indicating copyright information, and additional information is formed on the optical recording medium, such that the additional information cannot be copied.

2. The optical recording medium according to claim 1, wherein the additional information is formed by a plurality of pits, each pit having a depth formed according to the additional information.

3. The optical recording medium according to claim 2, wherein the pits include a first pit having a first depth and a second pit having a second depth, and when a wavelength of a reproduction light beam is $\lambda$ and a refractive index of the optical recording medium is n, the first depth is less than $\lambda/4n$, and the second depth exceeds $\lambda/4n$.

4. The optical recording medium according to claim 1, wherein the additional information is formed by pits, and the pits are formed at a position shifted from a regular pit position in a track direction according to the additional information.

5. The optical recording medium of claim 1, wherein the optical recording medium includes a plurality of regions, each region having an error correcting code associated therewith, such that the main information is error corrected using the error correction code to generate reproduction main information, and the additional information is formed by a difference between the reproduction main information and the main data recorded on the optical recording medium.

6. The optical recording medium of claim 1, wherein the additional information indicates that the recording medium is original.

7. A reproducing apparatus comprising:

reproducing means for reproducing an optical recording medium having main information stored thereon; and reproduction restricting means for determining whether additional information is formed on the optical recording medium such that the additional information cannot be copied and determining whether digital watermarking is embedded in the main information such that copying of the main information also copies the digital watermarking, the reproduction restricting means restricting reproduction of the main information if it is determined that:

(i) digital watermarking is embedded in the main information such that copying of the main information also copies the digital watermarking, and (ii) additional information that cannot be copied indicating that the recording medium is original is not formed on the optical recording medium.

8. The reproducing apparatus according to claim 7, wherein the additional information is formed by a plurality of pits, each pit having a depth formed according to the additional information.

9. The reproducing apparatus according to claim 8, wherein the pits include a first pit having a first depth and a second pit having a second depth, and when a wavelength of a reproduction light beam is $\lambda$ and a refractive index of the optical recording medium is n, the first depth is less than $\lambda/4n$, and the second depth exceeds $\lambda/4n$.

10. The reproducing apparatus according to claim 7, wherein the additional information is formed by pits, and the pits are formed at a position shifted from a regular pit position in a track direction according to the additional information.

11. The reproducing apparatus according to claim 7, wherein the optical recording medium includes a plurality of regions, each region having an error correcting code associated therewith, such that the main information is error corrected using the error correction code to generate reproduction main information, and the additional information is formed by a difference between the reproduction main information and the main data recorded on the optical recording medium.

12. The reproducing apparatus according to claim 7, wherein the additional information indicates that the recording medium is original.

13. A method of reproducing main information stored on an optical recording medium comprising:

(a) determining whether additional information that cannot be copied is formed on the optical recording medium;

(b) if it is determined in (a) that additional information that cannot be copied is not formed on the optical recording medium, determining whether digital watermarking is embedded in the main information such that copying of the main information also copies the digital watermarking;

(c) if it is determined in (a) that additional information that cannot be copied is formed on the optical recording medium, reproducing the main information;

(d) if it is determined in (b) that digital watermarking is not embedded in the main information such that copying of the main information also copies the digital watermarking, reproducing the main information; and (e) if it is determined in (a) that additional information that cannot be copied is not formed on the optical recording medium and it is determined in (b) that digital watermarking is embedded in the main information such that copying of the main information also copies the digital watermarking, restricting reproduction of the main information.

14. The method according to claim 13, wherein the additional information is formed by a plurality of pits, each pit having a depth formed according to the additional information.

15. The method according to claim 14, wherein the pits include a first pit having a first depth and a second pit having a second depth, and when a wavelength of a reproduction light beam is $\lambda$ and a refractive index of the optical recording medium is n, the first depth is less than $\lambda/4n$, and the second depth exceeds $\lambda/4n$.

16. The method according to claim 13, wherein the additional information is formed by pits, and the pits are formed at a position shifted from a regular pit position in a track direction according to the additional information.

17. The method according to claim 13, wherein the optical recording medium includes a plurality of regions, each region having an error correcting code associated therewith, such that the main information is error corrected using the error correction code to generate reproduction main information, and the additional information is formed by a difference between the reproduction main information and the main data recorded on the recording medium.

18. The method according to claim 13, wherein the additional information indicates that the recording medium is original.

* * * * *